(12) United States Patent
Han et al.

(10) Patent No.: US 10,312,033 B2
(45) Date of Patent: Jun. 4, 2019

(54) LIFTABLE KEYBOARD

(71) Applicant: Microjet Technology Co., Ltd., Hsinchu (TW)

(72) Inventors: Yung-Lung Han, Hsinchu (TW); Chi-Feng Huang, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 97 days.

(21) Appl. No.: 15/796,037

(22) Filed: Oct. 27, 2017

(65) Prior Publication Data

US 2018/0122595 A1 May 3, 2018

(30) Foreign Application Priority Data

Oct. 28, 2016 (TW) .............................. 105134947 A

(51) Int. Cl.
| | | |
|---|---|---|
| *H01H 13/14* | (2006.01) | |
| *H01H 13/7065* | (2006.01) | |
| *H01H 13/702* | (2006.01) | |
| *H01H 13/78* | (2006.01) | |
| *H01H 13/86* | (2006.01) | |
| *G06F 1/16* | (2006.01) | |
| *H01H 13/82* | (2006.01) | |

(52) U.S. Cl.
CPC ....... *H01H 13/7065* (2013.01); *G06F 1/1666* (2013.01); *H01H 13/14* (2013.01); *H01H 13/702* (2013.01); *H01H 13/78* (2013.01); *H01H 13/82* (2013.01); *H01H 13/86* (2013.01); *H01H 2213/002* (2013.01); *H01H 2223/052* (2013.01); *H01H 2223/062* (2013.01); *H01H 2231/042* (2013.01)

(58) Field of Classification Search
CPC .. H01H 13/7065; H01H 13/14; H01H 13/702; H01H 13/78; G06F 1/1666
USPC ........................................................ 200/341
See application file for complete search history.

(56) References Cited

U.S. PATENT DOCUMENTS

| | | | | |
|---|---|---|---|---|
| 9,367,104 | B2* | 6/2016 | Liu ........................ | G06F 1/203 |
| 2003/0183659 | A1* | 10/2003 | Van Zeeland ............ | B32B 7/02 |
| | | | | 222/399 |
| 2003/0232481 | A1* | 12/2003 | Huang ................... | H01L 28/55 |
| | | | | 438/396 |
| 2012/0223914 | A1* | 9/2012 | Ciesla ................... | G06F 3/0202 |
| | | | | 345/174 |
| 2017/0262025 | A1* | 9/2017 | Amarilio ............... | G06F 1/1618 |

* cited by examiner

*Primary Examiner* — Edwin A. Leon
*Assistant Examiner* — Iman Malakooti
(74) *Attorney, Agent, or Firm* — Kirton McConkie; Evan R. Witt

(57) ABSTRACT

A liftable keyboard for a portable electronic device is provided. The portable electronic device includes a top cover and a base. The liftable keyboard includes at least one key unit, a membrane switch circuit layer and a micro pump. Each key unit includes a keycap and an elastomer. When a sensing element within the base of the portable electronic device senses that the top cover is close to the base, the micro pump is enabled to perform a gas-extracting action. Consequently, the gas in the elastomeric chamber is extracted so that the elastomer is subjected to compressed deformation. The keycap is moved downwardly in response to the compressed deformation of the elastomer so as to reduce an altitude of the at least one key unit.

14 Claims, 5 Drawing Sheets

LIFTABLE KEYBOARD

FIELD OF THE INVENTION

The present invention relates to a keyboard, and more particularly to a liftable keyboard with a micro pump.

BACKGROUND OF THE INVENTION

In today's information generation, the computer has become an indispensable electronic information product in everyone's life. The peripheral input device of the computer includes a mouse, a keyboard, a writing board, or the like. Amongst those devices, the keyboard plays an irreplaceable role because it allows user to rapidly input characters and symbols into the computer, and allows user to edit plural document files at the same time.

FIG. 1 is a schematic perspective view illustrating the appearance of a conventional keyboard. The conventional keyboard 1 is used for being built in a laptop, and consists of a base portion 11 and plural keys 10. The arrangement of the keys 10 is determined according to the design of the manufacturer. When any of the keys 10 is pressed by user's finger, a corresponding character, symbol or number is entered.

FIG. 2 is a schematic cross-sectional view illustrating a conventional keyboard. As shown in FIG. 2, the keyboard 1 comprises the base portion 11 and the plural keys 10. Each key 10 comprises a keycap 101, a scissor connecting element 102 and an elastomer 103 aligned with the keycap 101. The scissor connecting element 102 is connected to the keycap 101, and also connected to the elastomer 103. The base portion 11 comprises a membrane switch circuit 12, plural spacing structures 13, a supporting plate 14 and a lower casing 15. The membrane switch circuit 12 comprises an upper wiring board 121, a separation layer 122 and a lower wiring board 123, all of which are made of a light-transmissible material. The membrane switch circuit 12 further comprises plural key switches 124, each of which corresponds to a key 10 and is configured to be aligned with the center of the elastomer 103 of the corresponding key 10. Once the keycap 101 of any one of the keys 10 is pressed down, the two interlock pieces of the scissor connecting element 102 swings and depresses the elastomer 103, therefore triggering the corresponding key switch 124 disposed on the membrane switch circuit 12. Consequently, the triggered key switch 124 generates output signals.

Please refer to FIG. 2 again. The supporting plate 14 is located under the membrane switch circuit 12 for supporting it. The lower casing 15 wraps the supporting plate 14 and the membrane switch circuit 12 for protecting them. The plural spacing structures 13 are disposed on the membrane switch circuit 12, each of which is arranged between every two adjacent keys 10. An accommodation space 131 is consequently formed between each two adjacent spacing structures 13 for receiving the scissor connecting element 102 and the elastomer 103 of each key 10. The keycap 101 of the key 10 is supported by the scissor connecting element 102 and the elastomer 103, therefore having an altitude higher than the altitude of the spacing structure 13. When the keycap 101 is pressed down, the two interlock pieces of the scissor connecting element 102 swings and the elastomer 103 is subjected to downward deformation to trigger the key switch 124. Under this circumstance, the altitude of the keycap 101 is lowered in response to the pressing force of the user, sinking into the accommodation space 131. However, when the keycap 101 is no longer pressed by the user, the elastomer 103 is subjected to upward deformation in response to the elastic force of itself, and the keycap 101 is returned to its original position. Meanwhile, the scissor connecting element 102 also goes back to its initial state and supports the keycap 101 as a level higher than the spacing structure 13, protruding out from the accommodation space 131.

Nowadays, the trends of designing electronic devices are toward small size, light weightiness and easy portability. Above-mentioned structure of the conventional keyboard 1 has a fixed height, so it is difficult to reduce the altitude of the overall keyboard 1 and the product with the conventional keyboard 1 is heavy and large.

Therefore, there is a need of providing an improved low-profile keyboard in order to overcome the drawbacks of the conventional technologies.

SUMMARY OF THE INVENTION

An object of the present invention provides a liftable keyboard. When a micro pump is enabled, a gas-extracting action is performed to extract the gas from the elastomer of each key unit. After the gas in the elastomer is extracted, the elastomer is subjected to the compressed deformation so as to descend the keycap. Thus, the key units automatically sink and maintained a low level, which can decrease the overall thickness of the portable electronic device when it is closed. In other words, the portable electronic device has the benefits of small size and easy portability.

In accordance with an aspect of the present invention, there is provided a liftable keyboard for a portable electronic device. The portable electronic device includes a top cover and a base with a sensing element. The liftable keyboard includes at least one key unit, a membrane switch circuit layer and a micro pump. Each key unit includes a keycap and an elastomer which is aligned with the keycap and has an elastomeric chamber. The membrane switch circuit layer includes at least one gas-inputting port and at least one gas-outputting port. The at least one gas-inputting port is aligned with an opening of the elastomeric chamber. The micro pump is located under the membrane switch circuit layer, having an inlet and an outlet, wherein the inlet is in communication with the gas-inputting port of the membrane switch circuit layer, and the outlet is in communication with the gas-outputting port of the membrane switch circuit layer. When the sensing element within the base of the portable electronic device senses that the top cover is close to the base, the micro pump is enabled to perform a gas-extracting action. While the gas-extracting action is being performed, a gas in the elastomeric chamber is extracted downwardly from the opening of the elastomeric chamber, passing through the gas-inputting port of the membrane switch circuit layer and entering to the micro pump through the inlet thereof. Then, the gas is outputted from the micro pump through the outlet thereof, and is discharged from the gas-outputting port of the membrane switch circuit layer. Consequently, the elastomer is subjected to compressed deformation due to the extraction of the gas inside. The keycap is moved downwardly in response to the compressed deformation of the elastomer. As a result, an altitude of the key unit is reduced and maintained.

In accordance with another aspect of the present invention, the micro pump further comprises a piezoelectric actuator. When the sensing element of the base of the portable electronic device senses that the top cover is close to the base, the piezoelectric actuator of the micro pump is actuated, so that a volume of a gas-collecting chamber of the micro pump is changed to generate a pressure difference that performing the gas-extracting action.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
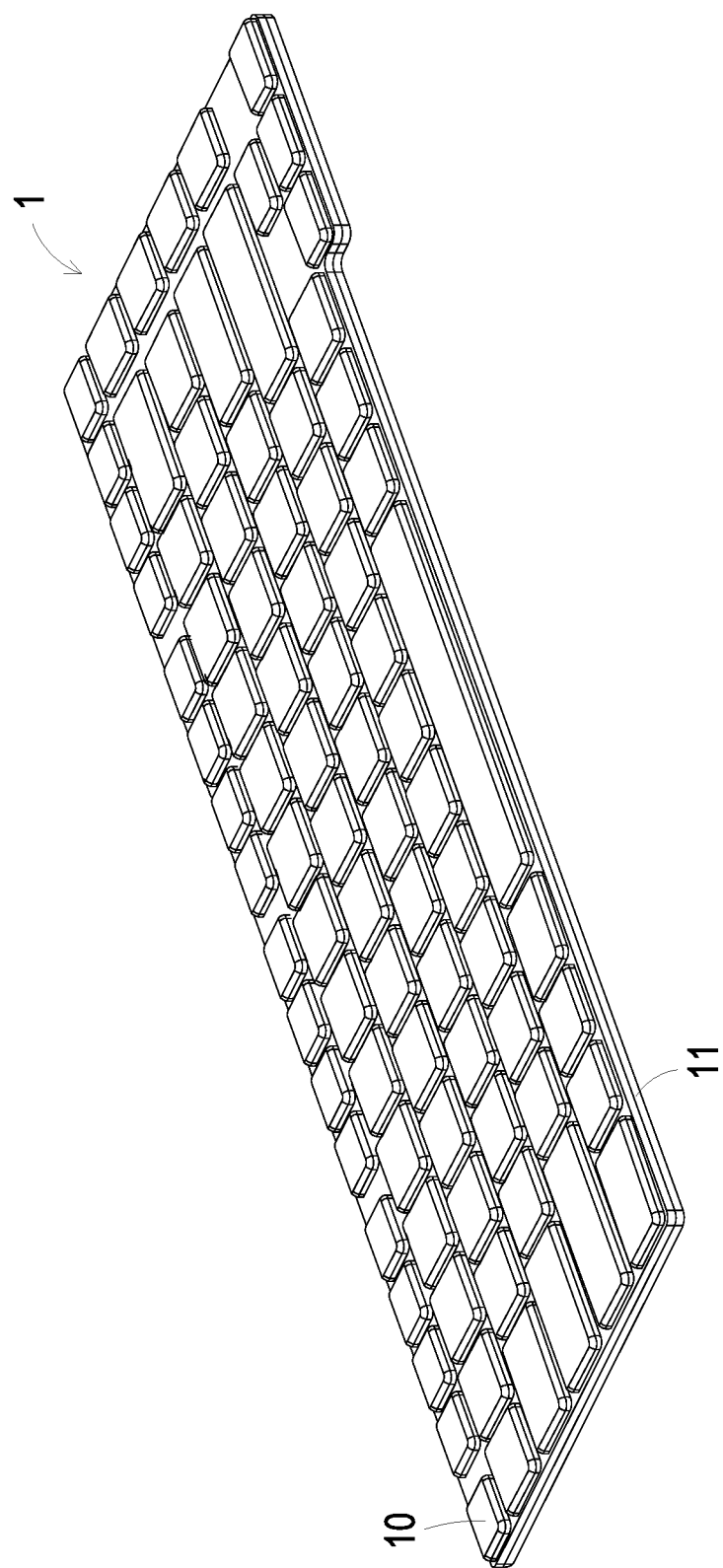
FIG. 1 is a schematic perspective view illustrating the appearance of a conventional keyboard.
Figure 2:
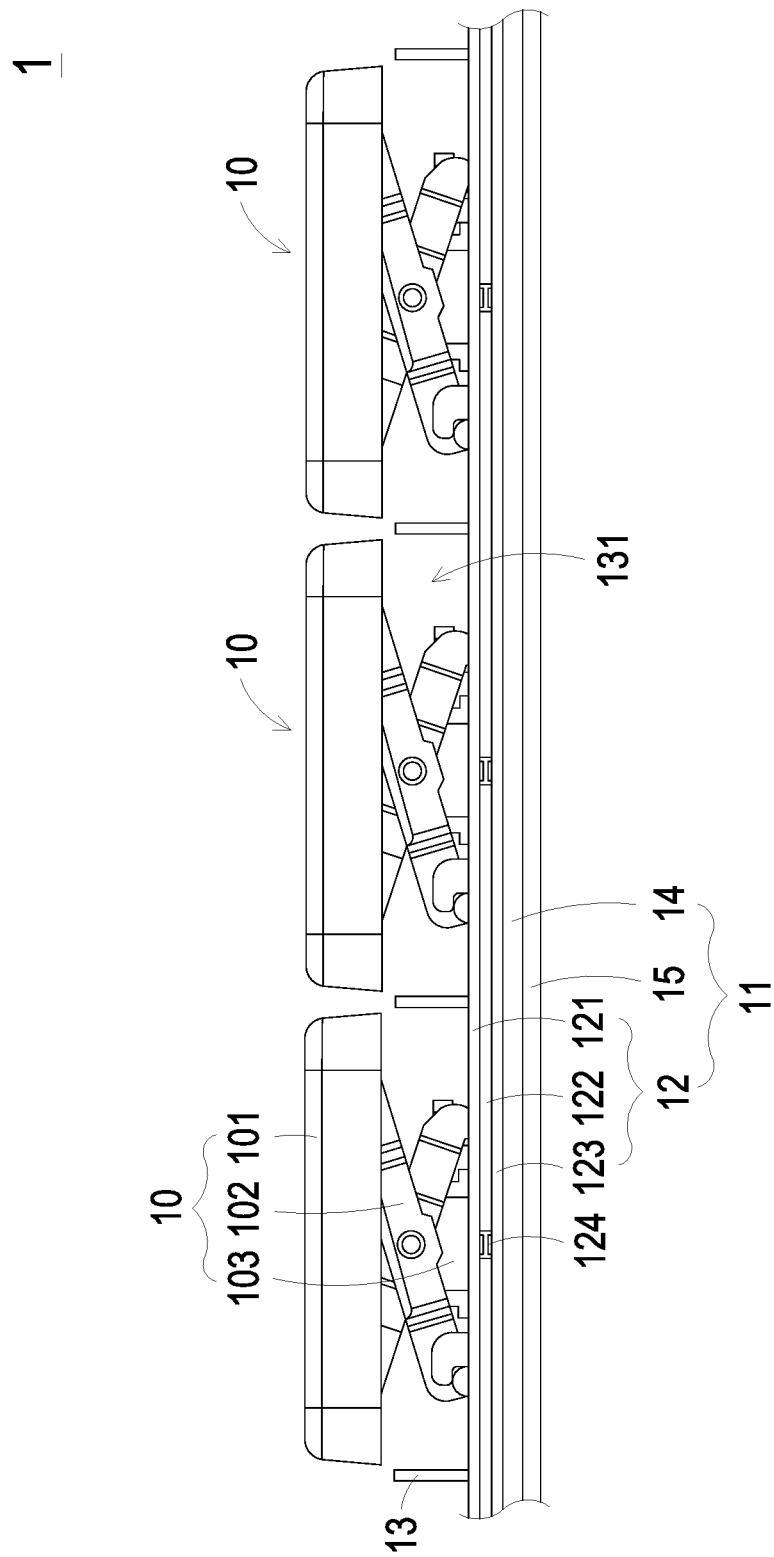
FIG. 2 is a schematic cross-sectional view illustrating a conventional keyboard.
Figure 3:
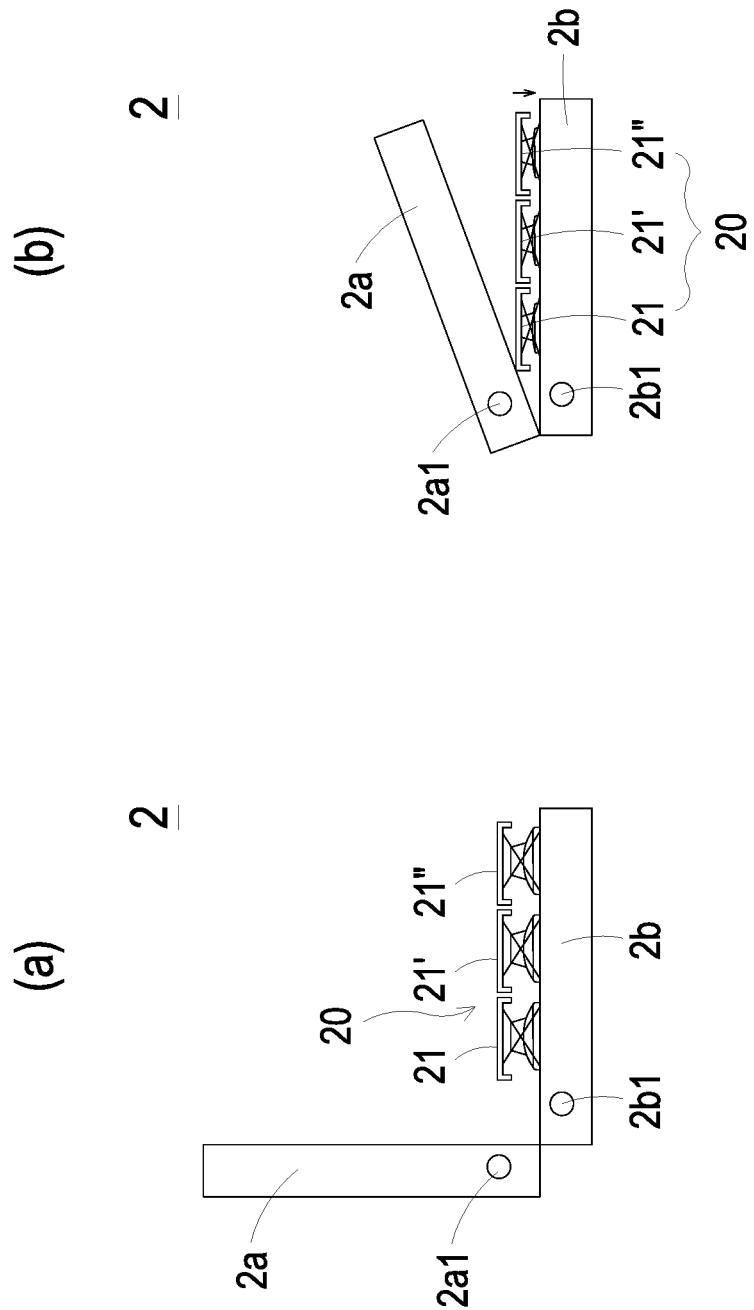
FIG. 3 is a schematic view illustrating the concepts of ascending and descending a liftable keyboard of the present invention.

FIG. 3 is a schematic view illustrating the concepts of ascending and descending a liftable keyboard of the present invention. The liftable keyboard 20 is built in a portable electric device 2, e.g. laptop, handheld device, mobile phone, or the like that is portable and constructed to include a CPU, RAM, and others. In this embodiment, the portable electronic device 2 is a laptop having a top cover 2a and a base 2b. The base 2b is a box structure that accommodates the liftable keyboard 20, and the top cover 2a is operable to cover the base 2b for sheltering the liftable keyboard 20 as well as relative electronic components. Such structure makes the portable electronic device 2 easy to carry. The liftable keyboard 20 comprises plural key units, for succinctness, only three key units 21, 21' and 21" are shown in the drawings. It is noted that the number and arrangement of the key units may be varied according to the practical requirements.

In some embodiments, a sensing element 2b1 is installed in the base 2b. An example of the sensing element 2b1 includes but is not limited to an electromagnetic sensor or an optical sensor. The sensing element 2b1 is used for detecting whether the top cover 2b is near the base 2b to cover the base 2b. In case that the sensing element 2b1 is the magnetic sensor, the top cover 2a is correspondingly equipped with a magnetic element 2a1 (e.g., a Hall sensor). As shown in FIG. 3, the sensing element 2b1 within the base 2b is able to detect the magnetic element 2a1 within the top cover 2a, when they are in a specified sensible distance. In the state (a), the base 2b is not covered by the top cover 2a, and the distance of the magnetic element 2a1 from the sensing element 2b1 is larger than the sensible distance. As a result, the magnetic element 2a1 cannot be sensed by the sensing element 2b1, and the sensing element 2b1 does not generate any sensing signal.

When the top cover 2a rotates about the base 2b to cover it, the magnetic element 2a1 is approaching to the sensing element 2b1. At the moment that the distance from the sensing element 2b1 to the magnetic element 2a1 is equal to or shorter than the sensible distance, which means they are closed enough, the magnetic element 2a1 is sensed by the sensing element 2b1. Consequently, the sensing element 2b1 generates an electromagnetic signal to enable a micro pump 23 (see FIG. 4A) to perform a gas-extracting action that descends the keys 21, 21' and 21" of the liftable keyboard 20. As depicted in the state (b), since the altitude of the liftable keyboard 20 has reduced and maintained, the portable electronic device 2 can be designed to have lessened overall thickness. As a result, the portable electronic device 2 has the benefits of small size, light weightiness and easy portability.

Figure 4A:
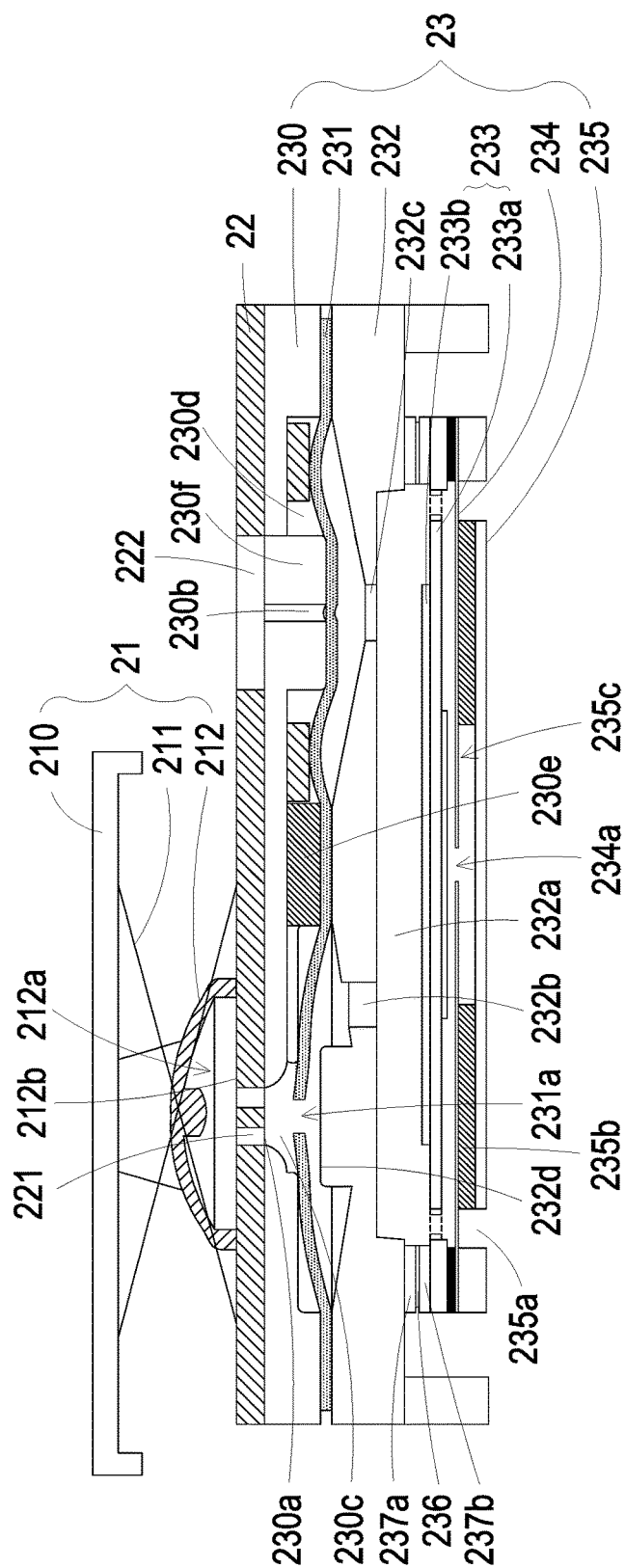
FIG. 4A is a schematic cross-sectional view illustrating a portion of the liftable keyboard and the micro pump according to an embodiment of the present invention.

FIG. 4A is a schematic cross-sectional view illustrating a portion of the liftable keyboard and the micro pump according to an embodiment of the present invention. In this embodiment, the liftable keyboard 20 comprises plural key units 21, a membrane switch circuit layer 22 and plural micro pump 23, all of which are disposed within the base 2b of the portable electronic device 2. For succinctness, only one key unit 21 is shown in the drawing. It is noted that the number and arrangement of the key units 21 may be varied according to the practical requirements.

Each of the plural key units 21 comprises a keycap 210, a scissor connecting element 211 and an elastomer 212. The keycap 210 has an inverted U-shaped structure. Preferably but not exclusively, the keycap 210 is made of a plastic material. The scissor connecting element 211 is connected to the keycap 210, and is also connected to the elastomer 212. The scissor connecting element 211 is adapted to support and move the keycap 210. The elastomer 212 is disposed under the keycap 210, not necessary to be in contact with the keycap 210 in an initial state, but can also be designed to contact the keycap 210 if there is any practical requirement. The elastomer 212 is a dome made of an elastic material such as rubber, having an elastomeric chamber 212a with an opening 212b at its bottom. When the gas in the elastomeric chamber 212a is extracted, the elastomer 212 is subjected to the compressed deformation such that the scissor connecting element 211 drives keycap 210 to move downwardly. Thus, the altitude of the key unit 21 is reduced.

Figure 4B:
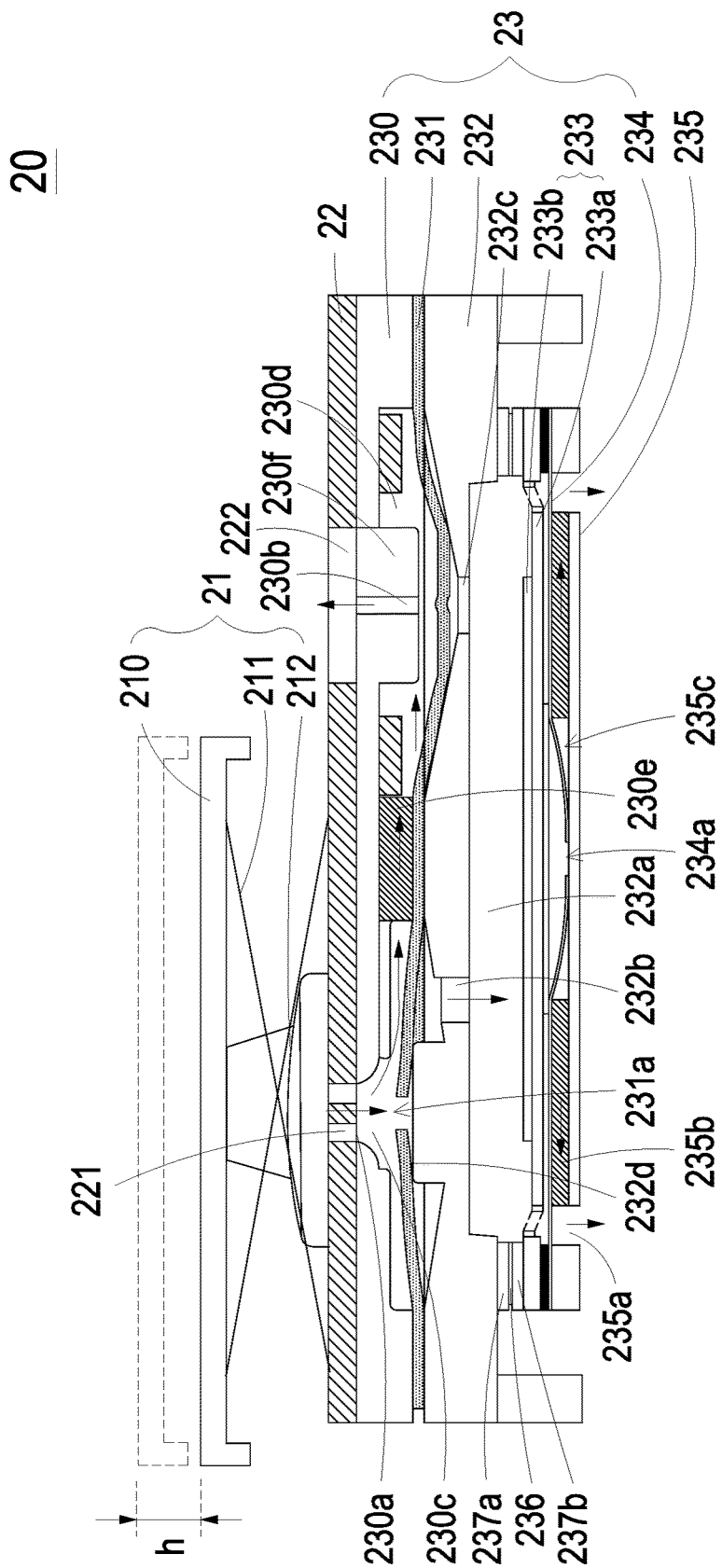
FIG. 4B is a schematic cross-sectional view illustrating the liftable keyboard of FIG. 4A and the concepts of ascending and descending the liftable keyboard.

Please refer to FIGS. 3, 4A and 4B. FIG. 4B is a schematic cross-sectional view illustrating the liftable keyboard of FIG. 4A and the concepts of ascending and descending the liftable keyboard. As shown in FIG. 4A, the membrane switch circuit layer 22 is located under the key units 21, and the micro pump 23 corresponding to the key unit 21 is located under the membrane switch circuit layer 22. The membrane switch circuit layer 22 comprises a gas-inputting port 221 and a gas-outputting port 222. Preferably but not exclusively, the gas-inputting port 221 is a ring-shaped hole. Moreover, the gas-inputting port 221 is aligned with the opening 212b of the elastomeric chamber 212a in the elastomer 212. Consequently, the gas-inputting port 221 is in communication with the elastomeric chamber 212a through the opening 212b.

In this embodiment, the micro pump 23 comprises a gas outlet plate 230, a valve membrane 231, a gas collecting plate 232, a piezoelectric actuator 233, a resonance plate 234 and a gas inlet plate 235, which are sequentially stacked. Moreover, the piezoelectric actuator 233 comprises a suspension plate 233a and a piezoelectric ceramic plate 233b. The gas outlet plate 230 comprises an inlet 230a, an outlet 230b, an inlet buffer chamber 230c, an outlet buffer chamber 230d and a communication channel 230e. A first side of the inlet 230a is in communication with the gas-inputting port 221 of the membrane switch circuit layer 22, while a second side of the inlet 230a is in communication with the inlet buffer chamber 230c. In the meantime, a first side of the outlet 230b is in communication with the gas-outputting port 222 of the membrane switch circuit layer 22, and a second side of the outlet 230b is in communication with the outlet buffer chamber 230d. The inlet buffer chamber 230c and the outlet buffer chamber 230d are used for temporarily storing the gas. The communication channel 230e is in communication between the inlet buffer chamber 230c and the outlet buffer chamber 230d to link a passage in which the gas is allowed to pass.

The gas outlet plate 230 further comprises a raised structure 230f at the end of the outlet 230b. Preferably but not exclusively, the raised structure 230f is a cylindrical post. The valve membrane 231 has a valve opening 231a aligned with the inlet 230a and the inlet buffer chamber 230c. The gas collecting plate 232 has a first perforation 232b and a second perforation 232c. The first end of the first perforation 232b and the first end of the second perforation 232c are both in communication with a gas-collecting chamber 232a. Meanwhile, the second end of the first perforation 232b is in communication with the inlet buffer chamber 230c, as the second end of the second perforation 232c is in communication with the outlet buffer chamber 230d. Moreover, the gas collecting plate 232 has a raised structure 232d protruding beside the first perforation 232b. Preferably but not exclusively, the raised structure 232d is a cylindrical post. After being assembled, the raised structure 232d is aligned with the valve opening 231a of the valve membrane 231 so as to form a one-way passage through the valve opening 231a, in which the gas is allowed to flow in one way when there is a pressure difference.

In one embodiment of the present invention, the micro pump 23 further comprises a first insulating plate 237a, a conducting plate 236 and a second insulating plate 237b, which are stacked over the piezoelectric actuator 233 sequentially. The profiles of the first insulating plate 237a, the conducting plate 236 and the second insulating plate 237b substantially match the profile of an outer frame of the piezoelectric actuator 233. The first insulating plate 237a and the second insulating plate 237b are made of an insulating material (e.g. a plastic material) for providing insulating efficacy. The conducting plate 26 is made of an electrically conductive material (e.g. a metallic material) for providing electrically conducting efficacy.

In this embodiment, the piezoelectric actuator 233 is located under the gas collecting plate 232. The piezoelectric actuator 233 comprises the suspension plate 233a and the piezoelectric ceramic plate 233b. The piezoelectric actuator 233 is used for driving the operation of the micro pump 23. The gas-collecting chamber 232a is defined by the gas collecting plate 232 and the piezoelectric ceramic plate 233b of the piezoelectric actuator 233, and is in communication with the inlet buffer chamber 230c through the first perforation 232b. Meanwhile, the gas-collecting chamber 232a is in communication with the second perforation 232c.

The resonance plate 234 is located under the piezoelectric actuator 233. The gas inlet plate 235 is located under the resonance plate 234. Preferably but not exclusively, the resonance plate 234 is made of a flexible material. Moreover, the resonance plate 234 has a central aperture 234a. In some embodiment, the resonance plate 234 is made of copper. The gas inlet plate 235 comprises at least one gas entrance 235a. In response to the action of the atmospheric pressure, a gas can be fed into the micro pump 23 through the at least one gas entrance 235a. The gas inlet plate 235 further comprises at least one convergence channel 235b in communication with the gas entrance 235a. After the gas is fed into the at least one gas entrance 235a, the gas is guided by the at least one convergence channel 235b and converged to a central recess 235c. Consequently, the gas is transferred upwardly through the central recess 235c of the gas inlet plate 235 and the central aperture 234a. Preferably but not exclusively, the gas inlet plate 235 is made of stainless steel.

The operations of the micro pump 23 will be illustrated with reference to FIGS. 4A and 4B. The micro pump 23 shown in FIG. 4A is not actuated. In this circumstance, the gas in the atmosphere is introduced into the micro pump 23 through the gas entrance 235a of the gas inlet plate 235. Secondly, the gas is transferred to the central recess 235c of the gas inlet plate 235 through the convergence channel 235b. Then, the gas is introduced into the gas-collecting chamber 232a trough the central aperture 234a of the resonance plate 234. Next, the gas is introduced into the inlet buffer chamber 230c and the outlet buffer chamber 230d through the inlet buffer chamber 230c and the outlet buffer chamber 230d respectively. Since the gas is continuously fed into the micro pump 23 through the gas entrance 235a, a pressure difference is generated to push the valve membrane 231. Consequently, the valve opening 231a of the valve membrane 231 is opened. Meanwhile, the gas is introduced into the inlet buffer chamber 230c through the valve opening 231a. Thus, the gas is transferred to the elastomeric chamber 212a of the elastomer 212 through the inlet 230a and the gas-inputting port 221 of the membrane switch circuit layer 22. Consequently, an initial shape of the elastomer 212 is maintained so as to make the scissor connecting element 211 supporting the keycap 210 in an initial position. At this moment, the keycap 21 has a higher altitude for being pressed by user. At the same time, the valve membrane 231 is subjected to upward deformation, and the top surface of the valve membrane 231 is in close contact with the raised structure 230f of the gas outlet plate 230 to close the outlet 230b. Since the gas in the micro pump 23 is not able to pass the outlet 230b to reach the gas-outputting port 222 of the membrane switch circuit layer 22, the gas in the micro pump 23 cannot be exhausted to the surroundings then.

Once the micro pump 23 receives the electromagnetic signal from the sensing element 2b1, the piezoelectric actuator 233 is actuated, making the suspension plate 233a subjected to curvy deformation in response to an applied voltage. In the meantime, the suspension plate 233a is moved downwardly with the piezoelectric ceramic plate 233b. Consequently, the volume of the gas-collecting chamber 232a is expanded, and the flowing direction of the gas is shown in FIG. 4B. Since the suspension plate 233a is moved downwardly and close to the resonance plate 234, the resonance plate 234 is vibrated downwardly. As a result, the gas in the central recess 235c of the gas inlet plate 235 is pushed to the convergence channels 235b at the bilateral sides. Consequently, the gas is outputted from the gas entrance 235a of the gas inlet plate 235.

Moreover, since the volume of the gas-collecting chamber 232a is expanded, a pressure difference is generated such that the gas is introduced into the gas-collecting chamber 232a through the first perforation 232b and the second perforation 232c of the gas collecting plate 232. Meanwhile, the valve membrane 231 is also moved downwardly in response to the pressure difference, having its bottom surface in close contact with the raised structure 232d and consequently closes the valve opening 231a. As a result, the gas in the inlet buffer chamber 230c is not returned back. Furthermore, the downward valve membrane 231 makes the outlet 230b of the gas outlet plate 230 in communication with the outlet buffer chamber 230d. Thus, the outlet buffer chamber 230d is in communication with the exterior surroundings through the gas-outputting port 222 of the membrane switch circuit layer 22. Consequently, the gas in the elastomeric chamber 212a of the elastomer 212 is introduced into the inlet buffer chamber 230c through the inlet 230a of the gas outlet plate 230, transferred to the outlet buffer chamber 230d through the communication channel 230e, and outputted to the exterior surroundings through the outlet 230b of the gas outlet plate 230 and the gas-outputting port 222 of the membrane switch circuit layer 22.

All in all, after the micro pump 23 is actuated, the gas in the elastomeric chamber 212a of the elastomer 212 is extracted, and the elastomer 212 is subjected to the compressed deformation. As the keycap 210 of the key unit 21 is moved downwardly by a displacement h, the altitude of the key unit 21 is reduced. Since the altitude of the liftable keyboard 20 is reduced, the overall thickness of the portable electronic device 2 is lessened. In other words, the portable electronic device 2 has the benefits of small size, light weightiness and easy portability.

From the above descriptions, the present invention provides a liftable keyboard. The liftable keyboard is applied to a portable electronic device. The liftable keyboard cooperates with a sensing element in the base. The liftable keyboard includes at least one key unit, a membrane switch circuit layer and a micro pump. When the top cover is rotated to cover the base, the sensing element generates an electromagnetic signal. In response to the electromagnetic signal, the micro pump is enabled. Consequently, a gas-extracting action of the micro pump is performed to extract the gas from an elastomeric chamber of an elastomer of the key unit. When the gas in the elastomeric chamber is extracted, the elastomer is subjected to the compressed deformation such that the keycap is moved downwardly. Thus, the altitude of the key unit is automatically reduced and the overall thickness of the liftable keyboard is decreased. Consequently, the portable electronic device can be designed to have lessened overall thickness. In other words, the portable electronic device has the benefits of small size, light weightiness and easy portability. As mentioned above, the liftable keyboard of the present invention is capable of automatically detecting the approaching condition of the top cover and reducing the altitude of the liftable keyboard. Therefore, the present invention has the significant advantage of reducing the overall volume of the applied product that making the portable electronic devices slim and easy to carry.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A liftable keyboard for use with a portable electronic device having a top cover and a base with a sensing element, the liftable keyboard comprising:
   at least one key unit, each of which comprises a keycap and an elastomer aligned with the keycap and having an elastomeric chamber;
   a membrane switch circuit layer comprising at least one gas-inputting port and at least one gas-outputting port, wherein the at least one gas-inputting port is aligned with an opening of the elastomeric chamber; and
   a micro pump located under the membrane switch circuit layer, comprising an inlet and an outlet, wherein the inlet is in communication with the at least one gas-inputting port of the membrane switch circuit layer, and the outlet is in communication with the at least one gas-outputting port of the membrane switch circuit layer,
   wherein when the sensing element within the base of the portable electronic device senses that the top cover is close to the base, the micro pump is enabled to perform a gas-extracting action, wherein while the gas-extracting action is being performed, a gas in the elastomeric chamber is extracted downwardly from the opening of the elastomeric chamber, passing through the at least one gas-inputting port of the membrane switch circuit layer and entering the micro pump through the inlet thereof, after which the gas is outputted from the micro pump through the outlet thereof and is discharged from the at least one gas-outputting port of the membrane switch circuit layer, so that the elastomer is subjected to compressed deformation, wherein the keycap is moved downwardly in response to the compressed deformation of the elastomer so as to reduce an altitude of the at least one key unit.

2. The liftable keyboard according to claim 1, wherein each key unit further comprises a scissor connecting element connected to the keycap and connected to the elastomer, and the scissor connecting element is adapted to support and move the keycap.

3. The liftable keyboard according to claim 1, wherein the micro pump further comprises:
   a gas outlet plate, comprising:
      an inlet buffer chamber;
      the inlet, a first side of which is in communication with the at least one gas-inputting port of the membrane switch circuit layer, and a second side of which is in communication with the inlet buffer chamber;
      an outlet buffer chamber;
      the outlet, a first side of which is in communication with the at least one gas-outputting port of the membrane switch circuit layer, and a second side of which is in communication with the outlet buffer chamber; and
      a communication channel in communication between the inlet buffer chamber and the outlet buffer chamber;
   a gas collecting plate located under the gas outlet plate;
   a valve membrane arranged between the gas outlet plate and the gas collecting plate, and having a valve opening;
   a piezoelectric actuator located under the gas collecting plate, and comprising a suspension plate and a piezoelectric ceramic plate, wherein a gas-collecting chamber is formed between the piezoelectric ceramic plate and the gas collecting plate;
   a resonance plate having a central aperture; and
   a gas inlet plate comprising at least one gas entrance, at least one convergence channel and a central recess, wherein after the gas is fed into the at least one gas entrance, the gas is guided by the at least one convergence channel and converged to the central recess,
   wherein when the sensing element within the base of the portable electronic device senses that the top cover is close to the base, the piezoelectric actuator is actuated such that the suspension plate is subjected to curvy deformation in response to an applied voltage, changing a volume of the gas-collecting chamber and generating a pressure difference to push the gas to flow downwardly from the inlet of the gas outlet plate, sequentially passing through the inlet buffer chamber, the communication channel and the outlet buffer chamber, to the outlet of the gas outlet plate and being outputted from the micro pump, after which the gas is discharged from the at least one gas-outputting port of the membrane switch circuit layer.

4. The liftable keyboard according to claim 3, wherein the micro pump further comprises at least one insulating plate and a conducting plate, which are located over the piezoelectric actuator.

5. The liftable keyboard according to claim 3, wherein the gas collecting plate further comprises a first perforation and a second perforation, wherein a first end of the first perforation is in communication with the gas-collecting chamber, and a second end of the first perforation is in communication with the inlet buffer chamber, wherein a first end of the second perforation is in communication with the gas-collecting chamber, and a second end of the second perforation is in communication with the outlet buffer chamber.

6. The liftable keyboard according to claim 5, wherein the micro pump further comprises plural raised structures, wherein a first raised structure of the plural raised structures is located at an end of the outlet, and a second raised structure of the plural raised structures is located beside the first perforation.

7. The liftable keyboard according to claim 1, wherein the sensing element is an electromagnetic sensor, and the top cover further comprises a magnetic element, wherein when the magnetic element is within a sensible distance of the electromagnetic sensor, the electromagnetic sensor generates an electromagnetic signal.

8. A liftable keyboard for use with a portable electronic device having a top cover and a base with a sensing element, the liftable keyboard comprising:
   at least one key unit, each of which comprises a keycap and an elastomer aligned with the keycap and having an elastomeric chamber;
   a membrane switch circuit layer comprising at least one gas-inputting port and at least one gas-outputting port, wherein the at least one gas-inputting port is aligned with an opening of the elastomeric chamber; and
   a micro pump located under the membrane switch circuit layer, comprising an inlet, an outlet and a piezoelectric actuator, wherein the inlet is in communication with the at least one gas-inputting port of the membrane switch circuit layer, and the outlet is in communication with the at least one gas-outputting port of the membrane switch circuit layer,
   wherein when the sensing element of the base of the portable electronic device senses that the top cover is close to the base, the piezoelectric actuator of the micro pump is actuated, so that a volume of a gas-collecting chamber of the micro pump is changed and a pressure difference is generated to perform a gas-extracting action, wherein while the gas-extracting action is being performed, a gas in the elastomeric chamber is extracted downwardly from the opening of the elastomeric chamber, passing through the at least one gas-inputting port of the membrane switch circuit layer and entering the micro pump through the inlet thereof, after which the gas is outputted from the micro pump through the outlet thereof and is discharged from the at least one gas-outputting port of the membrane switch circuit layer, so that the elastomer is subjected to compressed deformation, wherein the keycap is moved downwardly in response to the compressed deformation of the elastomer so as to reduce an altitude of the at least one key unit.

9. The liftable keyboard according to claim 8, wherein each key unit further comprises a scissor connecting element connected to the keycap and connected to the elastomer, and the scissor connecting element is adapted to support and move the keycap.

10. The liftable keyboard according to claim 8, wherein the micro pump further comprises:
   a gas outlet plate, comprising:
      an inlet buffer chamber;
      the inlet, a first side of which is in communication with the at least one gas-inputting port of the membrane switch circuit layer, and a second side of which is in communication with the inlet buffer chamber;
      an outlet buffer chamber;
      the outlet, a first side of which is in communication with the at least one gas-outputting port of the membrane switch circuit layer, and a second side of which is in communication with the outlet buffer chamber; and
      a communication channel in communication between the inlet buffer chamber and the outlet buffer chamber;
   a gas collecting plate located under the gas outlet plate;
   a valve membrane arranged between the gas outlet plate and the gas collecting plate, and having a valve opening;
   the piezoelectric actuator located under the gas collecting plate, comprising a suspension plate and a piezoelectric ceramic plate, wherein a gas-collecting chamber is formed between the piezoelectric ceramic plate and the gas collecting plate;
   a resonance plate having a central aperture; and
   a gas inlet plate comprising at least one gas entrance, at least one convergence channel and a central recess, wherein after the gas is fed into the at least one gas entrance, the gas is guided by the at least one convergence channel and converged to the central recess,
   wherein when the sensing element within the base of the portable electronic device senses that the top cover is close to the base, the piezoelectric actuator is actuated such that the suspension plate is subjected to curvy deformation in response to an applied voltage, changing the volume of the gas-collecting chamber and generating the pressure difference to push the gas to flow downwardly from the inlet of the gas outlet plate, sequentially passing through the inlet buffer chamber, the communication channel and the outlet buffer chamber, to the outlet of the gas outlet plate and being outputted from the micro pump, after which the gas is discharged from the at least one gas-outputting port of the membrane switch circuit layer.

11. The liftable keyboard according to claim 10, wherein the micro pump further comprises at least one insulating plate and a conducting plate, which are located over the piezoelectric actuator.

12. The liftable keyboard according to claim 10, wherein the gas collecting plate further comprises a first perforation and a second perforation, wherein a first end of the first perforation is in communication with the gas-collecting chamber, and a second end of the first perforation is in communication with the inlet buffer chamber, wherein a first end of the second perforation is in communication with the gas-collecting chamber, and a second end of the second perforation is in communication with the outlet buffer chamber.

13. The liftable keyboard according to claim 12, wherein the micro pump further comprises plural raised structures, wherein a first raised structure of the plural raised structures is located at an end of the outlet, and a second raised structure of the plural raised structures is located beside the first perforation.

14. The liftable keyboard according to claim 8, wherein the sensing element is an electromagnetic sensor, and the top cover further comprises a magnetic element, wherein when the magnetic element is within a sensible distance of the electromagnetic sensor, the electromagnetic sensor generates an electromagnetic signal.

\* \* \* \* \*